Feb. 22, 1949.  J. H. WILSON  2,462,450
SCOOP AND SIPHON FOR WATER COOLING SYSTEMS
Filed July 12, 1945  2 Sheets-Sheet 1
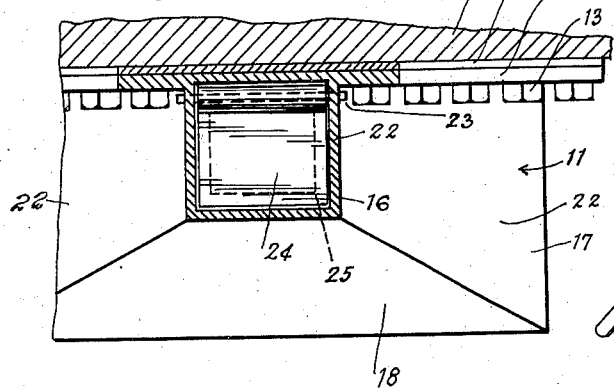
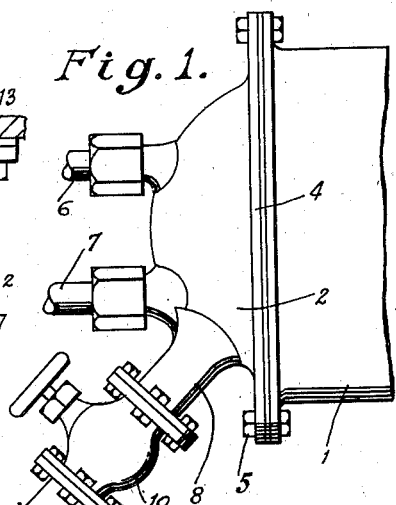
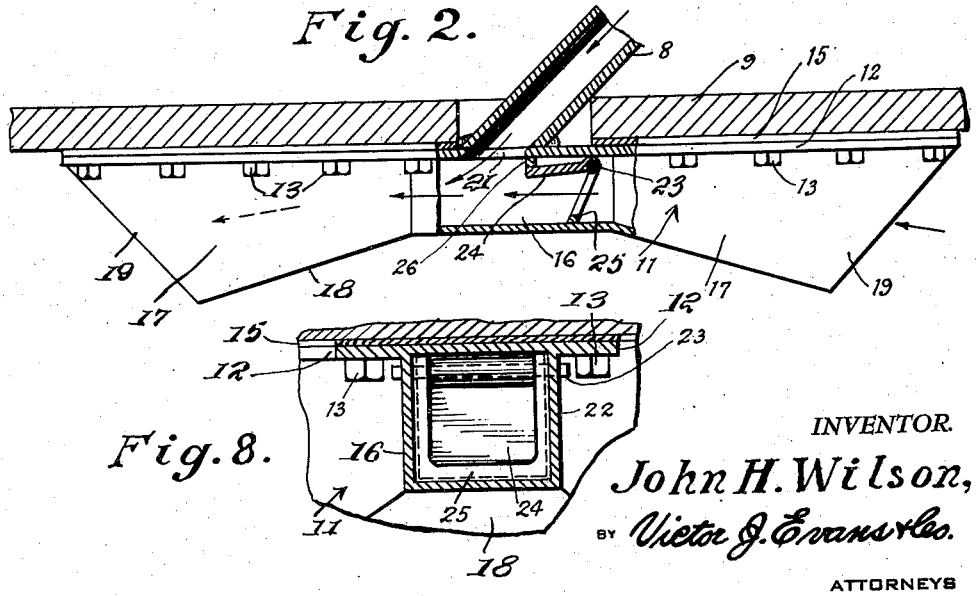
INVENTOR.
John H. Wilson,
BY Victor J. Evans & Co.
ATTORNEYS

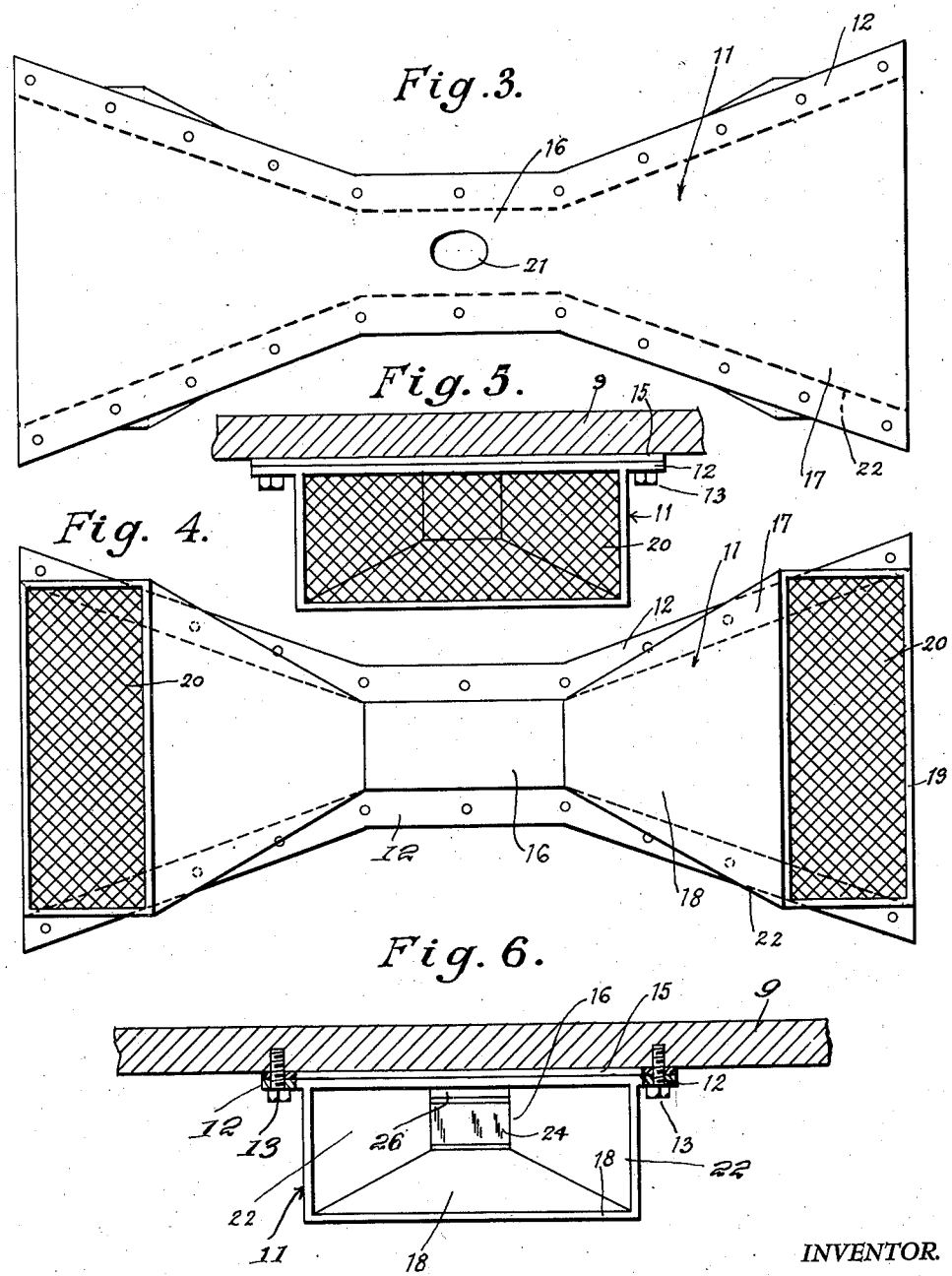

Patented Feb. 22, 1949

2,462,450

UNITED STATES PATENT OFFICE 2,462,450

SCOOP AND SIPHON FOR WATER-COOLING SYSTEMS

John Harrison Wilson, Bay Shore, N. Y.

Application July 12, 1945, Serial No. 604,701

6 Claims. (Cl. 115—0.5)

My present invention, in its broad aspect, has to do with improvements in the scoops for salt water cooling systems for the cooling mediums of power plants of boats, such as are defined in my companion patent application, and it is one of the principal purposes of my present invention to provide a scoop which operates as a cold water intake or a syphoning hot water exhaust, depending on whether a boat is going forward or backward, or the water moving through the scoop in one direction or the other and which is constructed to produce a syphoning effect for withdrawing water. Other important purposes and advantages are: (1), to provide improved screen means on a novel and unique double acting scoop body; (2), to provide improved valve means, and (3), to provide a sturdy, practical, simple and efficient scoop which will insure a steady flow of cold salt water when water is moving through the scoop in one direction and a syphoning effect to withdraw water when water is moved through the scoop in the opposite direction.

Other and equally important objects and advantages of my invention will be apparent from the following description and drawings, and it is pointed out that changes in form, size, shape, materials and construction and arrangement of parts is permissible and within the purview of my broad inventive concept, and the scope of the appended claims.

In the drawings, wherein I have illustrated a preferred form of my invention:

Figure 1 is a longitudinal section through a scoop showing its assembly with a salt water cooling device and operating to take in cold salt water;

Figure 2 is a longitudinal section through a scoop showing it operating as an exhaust and syphon;

Figure 3 is a top plan view;

Figure 4 is a bottom plan view;

Figure 5 is an end view;

Figure 6 is a front view with the screen removed;

Figure 7 is a transverse section showing the flap valve, and

Figure 8 is a section showing the flap valve stop frame.

In the drawings, wherein like characters of reference are used to designate like or similar parts:

The numeral 1 designates an end of a cold water receiving and circulating tank operating in the manner disclosed in my companion application for Heat exchange filed August 8, 1945, Ser. No. 609,579, and 2 is the dome-like end closure which is flanged as at 4 and bolted to the tank as at 5. The tank has cooling medium circulation pipes 6 and 7 from a boat power plant (not shown), which passes the cooling fluid of the motor in heat transferring relationship to cold salt water introduced and circulated in the tank 1 after the manner shown and described in my companion patent application. A cold water intake connection (or hot water outlet connection) 8 extends through the boat bottom 9 and leads into the dome-like closure 2 for introduction of cold salt water when the boat is traveling forward and water moving through my scoop in one direction or to act as a syphon to withdraw water when the boat is going backward and water moving through the scoop in the opposite direction, and a similar connection is provided at the other end of the tank for use when the boat is traveling backward, and each connection is provided with a manual control valve 10. My present invention having to do with a scoop on each connection functions on one hand as a cold water intake and on the other as a syphoning hot water exhaust.

The body 11 of my scoop is elongated and flanged as at 12 and is bolted as at 13 to the boat bottom and a suitable waterproof gasket 15 is provided. The scoop has a restricted medial part 16 and angularly and downwardly flared end parts 17, and the bottom wall 18 is cut shorter than the back of the scoop to provide angularly and downwardly faced end mouth portions 19 which are guarded by screens 20. The back plate of the scoop has an opening 21 leading to connection 8 at its restricted part 16. The side walls 22 are flared or angled outwardly at the end portions from the restricted part 16 to provide uniformly widening end portions from the restricted part to the relatively large mouths. A formation, such as is shown and described, is extremely effective in producing a constant and powerful flow of water into the scoop.

Hinged as at 23 within the restricted part 16 is a flap valve 24 which seats on a frame 25 when in the position shown in Figure 1, and against a flange 26 when in the position shown in Figure 2. When the boat is going forward or water flowing through the scoop in the direction as indicated by arrows in Figure 1, the flap valve 24 is closed to divert and introduce a powerful flow of water through the connection 8 to the salt water cooling tank. It will be noted that the flap valve is hinged back of the opening 21 a considerable distance so that it does not close the opening in any position.

When the boat is propelled backward or water is flowing through the scoop in the direction of the arrows in Figure 2, the flap valve 24 is opened as in that figure and the flow of cold salt water is straight through the scoop in the direction of the arrows to cause a syphoning effect to withdraw hot water from the tank 1 in the direction of the arrows in Figure 2.

From the foregoing, it is believed that the operation and advantages of my invention will be apparent, but it is again pointed out that interpretation of its scope should only be conclusive when made in the light of the subjoined claims.

I claim:

1. The combination of a boat having a hull and a scoop for conducting water and syphoning water into and out of the hull of the boat, comprising a hollow, elongated scoop body to be attached to the hull of the boat and having a fluid connection interiorly of the boat, said scoop body having a restricted central portion, outwardly and oppositely flaring end portions leading from the central portion to opposed mouths, the walls of the scoop body cut angularly and downwardly at the ends to incline the mouths downwardly, and a flap valve in the restricted part of the scoop to one side of the connection into the boat positioned to be moved to closed position by movement of water in one direction when the scoop is used to introduce water into the boat, and to be moved to an open position by movement of water in the opposite direction through the scoop to provide an unrestricted passage for water through the scoop past the connection into the boat to provide a syphoning effect to withdraw water from the boat.

2. The invention as defined in claim 1 wherein the mouths of the scoop are screened.

3. The invention as defined in claim 1 wherein the side and bottom walls of the scoop are respectively angled outwardly and downwardly from the restricted portion to the mouths, and the side walls at the mouths cut at an angle downwardly and toward each other to provide downwardly inclined mouths.

4. The invention as defined in claim 1 wherein the scoop is flanged and attached to the boat and a water sealing gasket is interpolated between the scoop and the boat.

5. The invention as defined in claim 1 wherein the flap valve is rectangular and hinged in the restricted part of the same to incline downwardly at a distance back of the connection to the interior of the boat and toward the end of the restricted part to partition the scoop to introduce water into the connection when water is moved into the scoop in one direction, and to be opened by pressure of water in the opposite direction to provide an unrestricted passage through the scoop past the connection to produce a syphoning effect to withdraw water from the boat.

6. The invention as defined in claim 1 wherein the flap valve has a frame in the scoop against which it is seated to partition the scoop, and the restricted part and end parts are rectangular in cross-section.

JOHN HARRISON WILSON.

REFERENCES CITED

The following references are of record in the file of this patent:

UNITED STATES PATENTS

| Number | Name | Date |
| --- | --- | --- |
| 1,893,039 | Schmidt | Jan. 3, 1933 |
| 2,138,368 | Briant | Nov. 29, 1938 |
| 2,138,369 | Briant | Nov. 29, 1938 |